United States Patent
Elledge et al.

(10) Patent No.: US 7,293,568 B2
(45) Date of Patent: Nov. 13, 2007

(54) AQUEOUS SOLUTIONS OF SILICON METAL AND METHODS OF MAKING AND USING SAME

(75) Inventors: Ben Elledge, Sugar Land, TX (US); Richard Okun, Fayetteville, NY (US); Robert Kulperger, New York, NY (US); Glen Davies, Dewitt, NY (US)

(73) Assignee: Silicon Chemistry, Inc., Stamford, CT (US)

( * ) Notice: Subject to any disclaimer, the term of this patent is extended or adjusted under 35 U.S.C. 154(b) by 0 days.

(21) Appl. No.: 11/001,308

(22) Filed: Dec. 2, 2004

(65) Prior Publication Data

US 2006/0027251 A1 Feb. 9, 2006

Related U.S. Application Data

(60) Provisional application No. 60/526,140, filed on Dec. 2, 2003.

(51) Int. Cl.
*B08B 9/00* (2006.01)
(52) U.S. Cl. .................... 134/22.1; 134/22.11; 134/40; 134/42
(58) Field of Classification Search ............... 134/22.1, 134/22.11, 40, 42
See application file for complete search history.

(56) References Cited

U.S. PATENT DOCUMENTS

| | | | | |
|---|---|---|---|---|
| 2,271,882 A | * | 2/1942 | Ambler, Jr. | 208/179 |
| 2,690,432 A | | 9/1954 | Den Herder | |
| 2,980,731 A | | 4/1961 | Alheritiere et al. | |
| 4,336,235 A | * | 6/1982 | Deabriges | 423/332 |
| 4,570,713 A | | 2/1986 | Rice | |
| 4,571,328 A | | 2/1986 | Rice | |
| 4,676,953 A | * | 6/1987 | Jeromin et al. | 422/106 |
| 5,000,933 A | * | 3/1991 | Novotny et al. | 423/334 |
| 5,215,732 A | * | 6/1993 | Hachgenei et al. | 423/334 |
| 5,229,095 A | * | 7/1993 | Schimmel et al. | 423/334 |
| 5,302,364 A | * | 4/1994 | Feinblum | 423/340 |
| 5,462,723 A | | 10/1995 | Berry | |
| 5,678,238 A | * | 10/1997 | Billings et al. | 588/14 |
| 2005/0072445 A1 | * | 4/2005 | Elledge et al. | 134/2 |

FOREIGN PATENT DOCUMENTS

| | | |
|---|---|---|
| FR | 908 297 A | 4/1946 |
| WO | WO-93/04001 | 3/1993 |

\* cited by examiner

*Primary Examiner*—Sharidan Carrillo
(74) *Attorney, Agent, or Firm*—Crowell & Moring; John W. Ryan; Thomas M. Haas

(57) ABSTRACT

The present invention generally relates to a formulation created by reacting sodium hydroxide, water, and silicon metal which has unique properties and many uses. The instant invention is further directed to methods of producing and using such formulations.

7 Claims, No Drawings

AQUEOUS SOLUTIONS OF SILICON METAL AND METHODS OF MAKING AND USING SAME

RELATED APPLICATIONS

This application claims priority to Provisional Application No. 60/526,140, filed Dec. 2, 2003. This application also claims priority to pending U.S. patent application Ser. No. 10/913,483 filed 08/09/04, now abandoned, which is hereby incorporated by reference in its entirety.

FIELD OF THE INVENTION

The present invention generally relates to a formulation created by reacting sodium hydroxide, water, and silicon metal which has unique properties and many uses. The present invention further relates to methods of washing metal parts and cleaning using formulations comprising aqueous solutions of silicon. The present solution further relates to oil recovery using formulations comprising aqueous solutions of silicon.

BACKGROUND OF THE INVENTION

Silicon is well known in the art for providing an effective coating for use with a variety of applications. For example, silicon is often used to coat metals, thereby reducing corrosion of the metal. One of the disadvantages associated with the use of silicon as a coating has been the difficulty of providing silicon in an aqueous medium. This is in part due to silicon being insoluble in water. Many attempts have been made to combine silicon or other metals in an aqueous solution. For example, U.S. Pat. No. 4,571,328 to Rice relates to one such combination. The aqueous electrodeposition baths produced in accordance with U.S. Pat. No. 4,571,328 addresses some of the problems associated with prior art techniques of making silicon solutions. The patent describes the formation of an aqueous silicon solution from the combination of silicon, sodium hydroxide and water in the molar ratio of 6:1:10, respectively. While the resulting solutions may be useful, the manufacturing process disclosed is complex and dangerous and results in solutions that are unstable and inferior in quality and character to the solutions of the instant invention. As such, these solutions are not suited to the methods of the present invention.

U.S. Pat. No. 4,570,713, also to Rice, relates to aqueous silicon compounds for use with oil recovery methods. As with U.S. Pat. No. 4,571,328, this patent teaches the formation of a metal hydride from reacting a non-alkaline metal with an alkaline metal hydroxide in water. The metal hydride is water-soluble and may be diluted to a solution with specific gravity of 1.3. As in the '713 patent, the manufacturing process disclosed is complex and dangerous and results in solutions that are unstable Thus, it would therefore be desirable to provide a safe and effective method of manufacturing stable, aqueous solutions of silicon. The present invention solves the above problem by providing a safer, more effective method of reacting sodium hydroxide, water, and silicon metal to produce an aqueous solution of silicon which is more stable and has more useful properties than any known aqueous solution of silicon. The solutions of the instant invention have a myriad of uses as a result of this improved stability and its unique properties.

Washing hydrocarbons from metal parts has long been a tedious and inefficient means of cleaning tools, parts, and/or metal components. Hundreds of thousands of dollars are spent every month on cleaning solutions for use in parts washing machines around the country, and many of these solutions clean parts only marginally at best and leave unacceptable "dirty" parts at the end of the so-called cleaning cycle. The combination of these cleaning solutions and their by-products create serious waste water and effluent problems. Most cleaning products, e.g., petroleum based solvents, high pH industrial cleaners, etc., are (i) difficult to handle, (ii) highly volatile, and (iii) inherently toxic to our environment. Moreover, petroleum products that are recovered from parts washing machines are contaminated and are not re-usable or re-cyclable. And finally, many companies are forced to treat environmental effluent from the parts washing process to meet environmental standards, resulting in increased cost of business.

It is thus apparent that there still remains a long-felt, but unfulfilled need to provide an environmentally safe, simple wash capable of cleaning tools, parts, and/or metal components. The present invention solves the above stated problems through the use of a revolutionary formulation created by reacting sodium hydroxide, water, and silicon metal which has unique properties and many uses beyond that of a cleaning solution.

It becomes more apparent everyday that the production of oil in the United States and throughout the world is very important. Since oil is obviously a limited resource, it is imperative that we develop processes that will more efficiently extract oil from the earth. In the past, it was relatively easy to find new oil reserves when a field was depleted or became unprofitable. In many fields only 15-25% of the oil in place was actually recovered before reservoir pressure or drive was depleted or other factors made it uneconomical to continue to produce the field. As long as new reserves were readily available, old fields were abandoned. However, since most of the existing on-shore oil in the United States has already been discovered, it is obvious that such known reserves must be efficiently and economically produced.

It has been estimated that at least 50% of the known oil reserves of the United States cannot be recovered using conventional pumping methods. A substantial amount of this oil is of an abnormally low gravity, and/or high viscosity, often coupled with the fact that there is little or no pressure in the oil-bearing formation. In the absence of formation pressure, even oil of average viscosity and gravity is difficult to produce without adding external energy to the formation to move the oil into a producing borehole. Accordingly, a great deal of attention has recently been given to various methods of secondary recovery. Water flooding has been utilized with mixed results to attempt to increase the natural reservoir pressure hydraulically. Thermal flooding techniques, such as fire flooding, steam injection and hot water flooding have been utilized to alter the viscosity of the oil and hence, enhance its flow characteristics.

In those cases where the natural energy of the reservoir is insufficient to overcome the resistive forces such as the forces of viscous resistance and the forces of capillary action, external energy must be applied. To illustrate such cases, this phenomenon is typically encountered in shallow formations containing high viscosity oil that has little or no reservoir energy or formation pressure available, and in those oil-producing formations in which the reservoir energy has been depleted or dissipated. In this discussion, we have been referring to "mechanical" forces acting within the producing formation. In a formation in which the natural energy of the reservoir has been depleted, the mechanical forces in the formation have reached near equilibrium and no pressure differential is available to drive the oil from the formation into the well bore. In all of the cases where reservoir energy was depleted by conventional primary production, or non-existent in the first instance, the chemical balance of the producing formation remains undisturbed and in virtual equilibrium.

Artificial forces introduced into the reservoir such as water or gas through various "pressuring" or "flood" techniques of secondary recovery can effect a mechanical change in the formation by way of pressure. Steam pressure is likewise effective, with some side benefits from heat. Combustion of some of the oil in the formation through "fire-flooding" and heating a well bore serve to reduce the viscosity of the oil in place and enhance flow characteristics but lack a drive to force the oil through the formation and into a producing well bore. However, these are primarily mechanical forces applied and operating only on an exposed face or surface of the formation, and if some chemical or molecular change is accomplished in the fluids in the formation, it is limited to a localized phenomenon. The instant invention will enhance the flow characteristics of the oil in the formation.

Water flooding has a number of economic advantages as an oil recovery process. Although over half of the original oil in place can remain after water flooding, there are many factors which favor its use. Water of sufficient volume and quality for flooding is generally available. Because of its hydrostatic head, it is readily injected at sufficient rates in most reservoirs and spread well throughout the formation.

The investments usually required for initiating a water flood project include water supply wells, water treating facilities, pump stations, flow lines from the central plant to the injection wells, and the injection wells themselves. Depending upon the deliverability of the water supply wells and treating chemical costs, the cost can range from a few mills to as much as five cents or more per barrel of injected water.

Production costs have a similarly wide range. These can depend upon the type of lift equipment needed and whether any unusual treating is required to separate the produced oil and water. Where particularly troublesome oil-water emulsions exist, treatment and chemical costs can escalate rapidly.

In summary, however, through the use of available technology and equipment, water flooding is for a large number of reservoirs an economically attractive oil recovery method. Its limitation is that significant quantities of the oil initially in place are left unrecovered after water flooding.

Thus, there remains a long-felt and unfulfilled need for a method of improved oil recovery. The present invention greatly improves the process known as water flooding by substituting the silicon solutions of the present invention for water. The unique properties of the silicon solutions substantially increase the percentage of oil that can be collected in secondary recovery of oil fields and reservoirs.

SUMMARY OF THE INVENTION

The present invention contemplates a stable complex of silicon metal in an aqueous solution.

Further, it is an object of the present invention to provide methods of making stable, aqueous silicon solutions.

The present invention further embodies methods of washing hydrocarbons from metal parts.

The present invention also contemplates methods of using stable, aqueous, silicon solutions in the following cleaning methods:

Cleaning aromatic sludge tanks-specifically benzene, but also applicable to toluene, xylene, and other type tanks.
pits, oil and sludge and other wastes clean up: barges, railcars, rig wash slop oil recovery: coal slurry pond clean up, gun barrel separator clean up;
pipeline cleaning ("Pig" operations);
pipeline "Sock type" filter cleaners;
pipeline right of way clean up;
site, pad, and staging area clean up and remediation;
parts washing;
computer circuit board washing;
steam cleaning;
soil washing;
carpet cleaning;
carpet cleaning and flea treatment;
upholstery cleaning; and
cleaning concrete.

Another embodiment of the present invention is a method for improved oil recovery using silicon solutions. The silicon solutions can be used to flood an oil bearing material such as an oil well. The flooding increases the amount of oil that can be extracted from the oil bearing material.

The present invention also contemplates the following uses for liquid silicon solutions and products based on the solutions:
Carrier for other chemicals;
Additive for lubricant and engine oil enhancement;
Additive to water base paint for fire suppressant;
Wetting water for fire penetration and suppression;
Oxide and rust removal;
Fertilizer;
Carrier of fertilizers;
Direct additive for growth enhancement of fruits, vegetables, and grasses;
Additive for fire proofing wood and other cellulose source materials for construction industry;
Fireproof wood shingles;
Wetting agent for fire fighting . . . fire penetration;
Fireproof drop cloth for welders and metal workers;
Electrolyte electroplating of zinc and silicon material for anti-galling and anti-corrosion use as a de-oxidizer of old paints (especially on automobiles) restorative characteristics;
Replacement for meta-silicates;
Treatment for carbonaceous build up in heat exchangers ($O_2$ scavenging property);
Additive to any number of cellulose sources for production of fire proof particle board (saw dust, potato peals, old news paper, corn husks, cotton linters, and many others.
Dried, ground to small particle size and then saturated with the concentrate and then heated and compressed.);
USDA multi-cleaner for large food chains that is able to cut grease from the floor of the food preparation area, clean the grease in the grease trap/sewer outlet, and can be used on cleaning food preparation surfaces and food eating surfaces; and
Plastic-like, non-petroleum based, biodegradable materials with high strength to weight ratio.

Another embodiment of the present invention is for methods of making stable silicon foam materials.

The present invention also contemplates the use of a stable foam for fire and insulation applications including:
Fire doors;
Fire proof weight to strength ratio products for food galleys on commercial aircraft;

Insulation applications where both extreme high and low temperatures are present;
Fire walls in high rise construction;
Steel insulation on high rise buildings;
Home construction materials;
Insulation, fire proofing and sound proofing all in one material;
Fire proof packaging materials;
Fire proof pads for carpets;
Fireproof mattresses; and
Fire proof motor homes.

Another embodiment of the present invention is insect resistant particle boards.

Another embodiment of the present invention is for methods of producing a silicon materials with glass-like properties.

The invention also contemplates the following uses for the glass phase silicon material:
Gems for laser applications;
Encapsulation of nuclear and hazardous biological wastes;
Spun into fine glass fibers it can be a new non-flammable insulation material;
New fiber optics can use the unusual optical properties;
Special glass applications where high strength glass is required; and
Applications for cut and colored glass with properties similar to stained glass windows.

Other developments based on the silicon solutions include:
Production of high quality gemstones;
Electrodeposition of silicon;
Development of a new form of energy; and
Means and methods for extraction, collection, refinement, and development of Orbitally Realigned Mono-atomic Elements.

DETAILED DESCRIPTION OF THE INVENTION

For simplicity and illustrative purposes, the principles of the present invention are described by referring to various exemplary embodiments thereof. Although the preferred embodiments of the invention are particularly disclosed herein, one of ordinary skill in the art will readily recognize that the same principles are equally applicable to, and can be implicated in other compositions and methods, and that any such variation would be within such modifications that do not part from the scope of the present invention. Before explaining the disclosed embodiments of the present invention in detail, it is to be understood that the invention is not limited in its application to the details of any particular embodiment shown, since of course the invention is capable of other embodiments. The terminology used herein is for the purpose of description and not of limitation. Further, although certain methods are described with reference to certain steps that are presented herein in certain order, in many instances, these steps may be performed in any order as may be appreciated by one skilled in the art, and the methods are not limited to the particular arrangement of steps disclosed herein.

The composition of the instant invention is a stable complex of silicon metal in an aqueous solution. It has been discovered that the composition is more stable than previously described solutions of silicon and has a myriad of heretofore undisclosed uses. The instant invention provides a safe method of manufacturing aqueous solutions of silicon. This method requires an appropriate reaction vessel, silicon metal, and NaOH.

The Vessel

The first thing required is a suitable vessel to contain the reaction. While a single reaction, or in some cases several reactions can be run in any number of vessels the reaction will, in time, destroy just about any container from glass to steel. The reaction eventually causes "hydrogen embrittlement" and vessels can burst open spontaneously and if a reaction is underway this can be very hazardous. As such, the choice of reaction vessel is critical.

It has been determined that high percentage nickel materials are best suited to the task of resisting the problems associated with running the reaction but solid vessels of such material are not known nor used due to excessive costs. Lined or clad vessels are currently available in the market. The current preferred vessel is a reactor with a single bottom valve in the coned bottom and an open top. It is a nickel welded overlay design and the main structure is 1" thick 4140 steel.

The cone shaped bottom is critical as it has been found that using flat bottomed tanks and or beakers from a lab had the effect of exaggerating the "up the side rise" of the reaction and thus vessels had to have a higher side wall to "hold" the reaction in the rising or balloon stage. Without a coned bottom the reaction vessel typically needed to be sized six to eight times the volume of the base rock load to keep the reaction from boiling over the top. In some cases the ratio was even greater. With the coned bottom the load is easier to hold and the reaction has the noticeable "figure 8" rotation during the early reaction and the ratio is about 3.5 to one. The current vessel also has a reduced height to width ratio. The current vessel has a width of eight feet. The straight side is also eight feet and the distance from the coned bottom to the bottom of the valve is an additional five feet (5'). It is important that vessel have no crevices because crevice eddying will have a negative effect on the results. The reaction generates a significant amount of energy and substantial heat is produced, a heavy vessel can help in dissipating this heat and is also useful in holding initial heat in the course of the continued reaction.

During the reaction significant hydrogen is produced and the potential for explosion always exists where free hydrogen is present. Thus, care should be exercised while running the reaction regardless of the construction of the vessel.

The Silicon Metal

Upon procurement of a suitable vessel the reagents that are particular to the reaction are required. The silicon metal is in the form of rock. The current composition of the base rock by molar percent is:

| | |
|---|---|
| Silicon: | 99.18 |
| Iron: | .393 |
| Calcium | .022 |
| Aluminum: | .176 |

Currently such rock is available commercially in the U.S., Canada, and China.

The critical material, other than silicon, in this chemistry is the iron. If the iron content is above 0.5% the reaction will "brown out", that is, it will react but the resultant material will be brown in color and not have many of the properties of the required material. For example, it doesn't foam very well and the resultant foam seems to be slightly hydroscopic.

If the iron is not there at all or in very small amounts, as with reagent grade material, the reaction will not start without addition of external heat. When it does start it will react too vigorously unless water cooled. The "start" may take several hours of near boiling heat to cause the reaction to begin actual reaction and it will run only a short while when it does. Sometimes additional external heat is needed to have it be completed. The resultant material will be high purity and will be very clear to just slightly opaque and will never turn the "yellowish" color common to the desired material when it is exposed to sun light.

In order to properly perform the reaction, it is necessary to develop the "base rock" for the reactions and this takes time and understanding of the process. For the reactor described above, the silicon metal should be in chunks from 2" (two inches) minimum to 4" (four inches) in diameter or square maximum. Some very small particle size material is unavoidable but should be discouraged from the supplier. It will quickly convert into "fines" and will ride the top of the reaction and become a general nuisance as well as very damaging to pumps and mechanical seals in the process. If the particle size of the reaction is too small the reaction will over react and many times rush up the side of the reactor and spill onto the floor.

When starting the very first reaction one should know that in the early stages of the base rock development great accuracy is required. After a few reactions the base rock will begin to show reactivity signs that may look like saw cuts across the face of the rock and or worm hole type configurations that make a surface much like sea coral. This is called the "etching" process and until we have a base of rock that is over 4000 pounds or almost half of the gross maximum reaction weight, every portion of the 1-6-10 molar ratio must be managed with great care.

In a desired vessel we estimate by geometry what the maximum reaction possible will be from that vessel. In the case of our current vessel we determined that at somewhere around 8000 pounds we would reach the maximum amount of the desired product the vessel will hold.

Making the height greater and increasing the base has been tried and the extended "dome" portion of the reaction can and often does collapse into an improper reaction or "middle collapse" that can make the reaction products turn white . . . a common indicator of failure. In such a case the new load material is lost and the old material must be significantly cleaned if not removed and re-started, or a blue collapse where the material stops mid-reaction and returns to a blue rock like state can occur and this must be removed by hand from the reactor and in such cases if it is allowed to fully dry it must be removed by jack hammers. Thus, it is necessary to stay within the known parameters.

In the current example, one begins with one hundred pounds and work up 25% at a time until we get to 1000 pounds. We then double the base and run the reaction with and additional 12.6758% of the total base rock. The reaction was then doubled to 2000 pounds and three reactions run with the 253.52 pounds of fresh material. This resulted in 4 drums of 1.25 specific gravity material for six more reactions with the same replacement material. We then went to 4000 pounds and doubled the values and the percent yield was as expected based on the scale up ratio. We then went to 6000 pounds and finally 8000 pounds but the reaction was getting within a couple of feet of the top so we ran subsequent reactions 20 pounds at a time until we reached 8800 pounds and the reaction was one foot from the top.

The NaOH

Sodium hydroxide is dangerous to handle and is temperature sensitive. The process can be run with powdered material but it has been found that top loading of dry sodium hydroxide makes for poor base rock and eventual failure of the process. Loading the NaOH from the bottom is critical to a successful reaction.

The rock and water are loaded onto the base rock. Enough water is kept back to purge the load lines of the NaOH after it is loaded from the bottom. The NaOH is loaded and then the remainder of the water. One to two hundred gallons of water is enough to purge the lines and load the last of the NaOH into the reactor. The reaction will commence immediately with a bubbling and release of hydrogen.

Ratios

As a rule a good middle ratio reaction will yield 1.4 gravity material. The blend down to 1.25 gravity should increase the volume by a third.

It should be mentioned that this is the 1-6-10 ratio. The "window" is believed to be from 1 to 5.75 to 9 to 1 to 7.75 to 12. This is a restrictive "window" but it does leave some leeway for error. As can be seen, this formulation will allow the computation of any amount of silicon to the specified ratio. A spread sheet reflecting twenty pound increments up to four thousand pounds of base may be useful in building base reactions and the compensation for water and such could be pre-calculated. Using such a spreadsheet it could determined how much can be added to the batch each time to work up to the maximum "safe" volume that the reactor will hold during reaction without boiling over. This will also allow for the cross sectional area of the Si rock to be better treated as we expand the reactions, due to graduated increases. Large volume increases above the recommended increase is not recommended. The rock will over react or under react and the resulting "cross-sectional" areas of the rock will become imbalanced. Once they are radically out of balance the only means to get them back in balance is to start the "base building" process from the beginning. Taking care to scatter the reacted rock into the reactor gradually or wait until the 4000 pound base has been established to introduce the "damaged" rock.

After extensive experimentation, correct post reaction values and a theoretic use for predicting reactions was developed. The correct number is 12.6758% of the remaining base rock where all other variables have been made constant (heat temperature, pressure, time in reaction, size of rock, and application and mixture procedure for all reagents).

Methods

When preparing the start up rock for a reactor it becomes necessary to weigh after each reaction for the first four reactions to be assured that the weight to add is correct and in the "window". In the early reactions the margin for error is almost nil.

Initial reactions were performed with 100 pounds in the bottom of the reactor. The NaOH was carried inside the vessel by hand. By trial and error it was learned that in successive reactions one can only increase the amount of base by a maximum of 25.3516 percent of the original weight of the start up base or in this case the next reaction would be for 138.0274 pounds of Si rock or an addition of 50.7032 pounds of rock. The base reaction will yield about one drum of 1.3 gravity material per each sixty two pounds of reacted silicon rock. The 138.0274 reaction would yield 17.4960 reacted pounds or less than ⅓ of a drum of material.

The next reaction would be 173.0196 pounds. The subsequent ones would reflect a gradual growth of the base Accuracy is critical in all phases until the base rock is over 4000 pounds or until the rock has reached its own "balance" and the "sawed" surface or "worm hole" effect can be seen easily.

Past 4000 pounds the weight can be determined at 12.6 pounds without fear of "falling" from the window. The other ratios are still carefully controlled to the fourth decimal place.

At 6000 pounds of base rock the "window" seems to "stabilize" and amounts as high as 14% and as low as 11% percent by weight seem to find a correct "window". The finished material is simply a little more silicon rich. The weight of Si (silicon) can vary from 60 pounds per 55 gallon drum to 68 pounds per 55 gallon drum at 1.3 gravity. Below sixty pounds is always sodium silicate or sodium silicate and unstable, inferior silicon solution. Above 68 pounds is a ceramic like material that is very dense and friable and is very unstable. Using up 50% of the existing rock in an reaction is impossible. Further prolonged use of too much silicon will build large amounts of residual NaOH on the rock and a "blue" or super hot reaction can occur which leaves a very blue colored solution that will dry to a ceramic consistence if left in the air to dry.

The broader "window" allows for a circumstance where a less-than full compliment of Si could be used as long as the variance is noted and compensation is done on the next reaction to re-stabilize the base. The last of a batch of silicon or a shutdown circumstance might require such a decision.

Regular and sustained use of the base rock seems to show that only the "new rock" or added rock, gets reacted and the base rock seems to be unchanged except for the "saw" effect and some "worm hole" effects. This is usually easily seen on the level of the rock in the vessel. When running standard reactions the volumes will soon all look very much the same.

At 8000 pounds the "freedom" window is expanded and the full "window" of the reaction can be run and there seems to be no ill effect of additional water except to prolong the time of the reaction start up. This explains why heavy rains destroyed earlier reactions but have almost no effect on the current ones. One thousand and eight pounds of "new" Si rock added to this base yields 16.25 barrels of 1.3 gravity concentrate.

Clearly this method requires a lot of work and care to get to the base state. However this does not explain why a diligent person weighing each load and gradually adding "empirical" amounts will not eventually get to this "stable" state. There are several reasons for this but the most glaring is the temperature of the reaction at initial reaction.

A correct reaction started after a off load cool down will always start too fast if the presentation of the chemicals is done in the wrong order. Also, it was long believed that the base rock could not be fully covered with water for a "proper" reaction to occur. In fact, the opposite is true. The rock must be fully covered with water before any new base(NaOH) is induced.

Since the rock is often moved around and stacked by the preceding reaction the adding of the initial water should be over the top of the vessel and done by hand to fully wash down the base rock and wash off the dust from the new rock. The NaOH should be added from the bottom of the vessel through the primary drain valve. Then the last of the water should be added from the bottom through the same hoses to purge all the NaOH and clear the bottom of the NaOH (this is critical). Very soon a distinctive figure eight movement of the water and NaOH can be seen in a "rolling" motion in the bottom of the vessel.

Top loads or loads in different order do not produce the distinctive figure eight reaction and often result in low stability, inferior silicon solutions or worse. The three most important parameters of the method are:

1. The preparation of the rock.

2. Scrupulous attention to the 12.657% reaction maximum (especially in the beginning of base rock preparation)

3. Loading parameters (load it in the wrong sequence and it will fail)

The following parameters are also relevant.

There is no definitive mechanism for knowing the reaction is complete except to let it go to term. This is the state where either "blobs" or "lily pads" of very thick material appear on the surface or when the top is covered with a soft looking silver cover of very thick material. This occurs in a normal reaction in about 14 hours.

Off load earlier at your own peril. Reactions have been off loaded at 10 hours with success and reactions have been off loaded at 12 hours and failed. These disparities might be due to a late starting reaction. The use of hot water in the winter helps but is unnecessary in temperatures above 50 degrees. A good rule of thumb is the condition of the 50% by volume NaOH. If it is frozen, about 48 degrees F, it is a good time to use hot water or allow more time for reaction. At times it may take as much as two additional hours.

One should use about ten barrels of fresh water to circulate out of the bottom of the vessel and over the top. Again this should be done by hand and the "lily pads" should be targeted. The tank should not be off loaded until there is a homogenous material at around 1.35 gravity at near room temperature. Too much water will drop the material below the commercial level of 1.25 specific gravity. This material can be used as blend stock on the next reaction.

The material should not be off loaded directly to barrels for shipment or into light resistant tanks. It will remove the lining of even chemical lined barrels. It will hydrogen im-brittle plastic barrels and have the same effect on a long term basis on metal ones. Allow the Si solution to settle and cool and get some sun or UV rays to improve its stability characteristics. The amber color of the material comes from the exposure to light. It may be related to the iron residual in the silicon metal since it doesn't occur in the high purity material.

Plastic storage tanks are light and easy to move and handle and allow the sun to access the material. Fines or other sediments will accumulate in these tanks. A 1% additional correction for a standard reaction of the new silicon metal on every fifth reaction compensates for the fines that are lost. One should never add fines to the reaction to try to "start it". This starts a vertical or non-figure eight reaction and as such it will fail, if not that time it will fail in subsequent reactions.

After about every fifty reactions the reactor should be cleared of all base rock and the remainder of the rock allowed one day to dry. It may turn white, this is of no consequence. It should then be weighed and returned to the reactor. Any maintenance to the tank or valves and such should be done at this time. There may be significant iron or black looking material in the bottom of the tank. It is of no use and should be removed. It is iron silicate and is land fill allowed. It would not be more than ten of twenty pounds but it can cause reaction troubles and is unsightly at best.

The size of the rock is important. When building the base of a new reactor the early reactions should be limited to material no greater in diameter than one inch. As the base is built the size can increase to two inches for 1000 pounds of base up to two thousand pounds. From two to four use a maximum of four inch. For four and above the six inch maximum rocks, which is the optimum price, is ok to use. However, a good mixture of smaller sizes is advisable until the base has had at least three reactions.

The reactions will reaction differently under different barometric and weather conditions. In wet low pressure conditions the risk of boil over is greater. In dry cold and high pressure conditions the risk is less great.

Expect the boiling volume to be from three to five times the level of the mixture at pre-reaction. If you react the material over night there will be a ring around the top of the vessel indicating how high the reaction reached in the vessel. The use of a top is dangerous since it could cause an explosion or pressure valves to blow off.

The pH of the as reacted material is 13-14. However, this pH is not truly indicative of the reactivity of the material. Ordinarily, 13+ pH material would be radically corrosive and extremely dangerous to have come in contact with your skin. The stable material is neither. The stability is also reflected in more than shelf life. Of course shelf life is important, but stability with reactions with other chemicals is important also.

Some anionic materials with very low pH such as acids will react violently with the material. Of course the material has a very valuable use for neutralizing acids in spills and industrial processes. Sodium hydroxide is commonly used in these cases and is very dangerous to handle, ship, and store. Hydroxide burns are far worse to treat and recover from than acid and temperature induced burns. The silicon material is only dangerous during the first two hours of the reaction. During that time it will burn you from the near 400 degree temperature and from the highly reactive and caustic base that is part of the early and intermediate stages. This is the time of the reaction that care should be exercised the most.

When the material settles down and just slowly bubbles and or "rolls" it becomes progressively less and less dangerous. At the end it is just hot to the touch and until it is diluted it should be avoided. It is over 180 degrees F. and it holds the temperature for an inordinately long time. Left un-diluted the reactor can be hot for several days.

When the reactor is to be shut down, water should be put on top of the silicon rock to assure no exposure to the air. Leaving the rock covered for several days is not harmful to the base. The water should be drained off and used as dilution material. It is not recommended to use it as start up water for the type one reaction since it will likely over react.

With new base or rock and a new vessel and a first reaction it will go pretty much as follows.

The start is as described before. It will get progressively more violent and begin to turn the effluent in an up the side back to the middle and then repeat the process very rapidly that we call "figure 8". In a very stable reaction this may take no longer than a couple of hours to begin to foam on the top with some blue fines in the foam and the gradual building of a "dome" or bubble dome as it is called by some.

If this "dome" makes it over the top of the vessel the reaction will shoot up the side and then collapse and fail to a "white or a "blue "reaction. Both are bad and to be avoided.

In the passage of a couple of hours the reaction will begin to subside and the dome will collapse to a boiling and turning reaction that is center specific. The outsides will begin to "crust up" or form fine and bubble barriers that may grow to cover the entire reaction. This is a sure sign of a very heavy and excellent reaction. This process may splinter and form what we call "lily pads" which are named because that is what they look like on top of the reactor. They are also a good sign but neither is necessary for a successful reaction but time is.

Allow the reaction the full 12.5 hours required. The errors are not always obvious and as a result we advise to err to the secure. Run the full time. The preferred reaction time is 14 hours with the only ill effects being a loss of water and difficulty extracting the material. The phase one material may also be used to dilute the hot material for extraction.

The off load is important and failure to off load can lead to the material drying into the rock and it takes days to get it out with endless washing and circulation. The material must be removed hot and quickly.

The settling process begins in the first storage tank and it is designed to allow fines to settle out and commencement to proper dilution from the 1.3 to 1.35 gravity down to 1.25, the commercial goal. Gravity and time do the work with water as the diluents and the tank quickly settles and in 2 to four days should be moved to the next tank.

We often circulate this tank and it is located where it is exposed to sun light. The sun is part of the equation. Move the phase one material to a dark tank and it will never change color and will continue to bubble hydrogen that can cause vessels to swell or burst. Settling tanks are always open topped.

Ten days in the settling tank or sun tank and the material is ready to go to the bulk tank and can be stored indefinitely and or put into drums. We have stored material in the bulk tank a year and had no change in pH, gravity or color. The preferred material for bulk tanks is plastic. Over a period of time the fines from the settling process will accumulate in the tanks. The fines should be removed periodically and they make good road grade material.

After the reaction process, water is used to wash the rock clear and put that water back into a smaller holding tank after a couple of hours of circulation and cooling the rock. This water may be used to dilute heavy reaction material when "Phase I" material is not readily available. It works almost as well but care needs to be exercised to not over dilute. Material dropped to 1.15 can be very hard to raise back to 1.25 gravity even with new heavy reacted material. It happens but slowly and with much circulation required.

Process Summary

In summary, the process of producing the silicon material involves a group of variables that all must be completed in a timed and often sequential order to produce stable silicon material.

First, the vessel must be of a size, design, material, and of construction suitable for proper exothermic reactions. That means a vessel that will withstand the heat generated by the reaction and the potential for hydrogen embrittlement. Nickel and nickel alloys have proven satisfactory. The vessel needs to have a coned bottom to assist in avoidance of "offset" or "crevice" related reactions that can become too hot or too reactive. The rolling reaction that is seen in start up and during successful reactions that we call "figure eight" will often not occur in flat bottomed vessels or vessels with areas where crevices can cause different reactions characteristics.

The vessel must be open at the top and valved at the bottom for water and chemical introduction into the vessel and for the off load mechanism after the finished reaction.

The base rock, or the amount of rock that is in the vessel prior to an initial reaction is a critical variable. When first beginning to "build" this "base" of silicon metal extreme care must be exercised to be exactly in the 1-6-10 molar calculation window, however one should note that this early reaction product may not be the "stable" material that will result once the "base" metal (rock) has been fully established. Removal of all the product of the first few reactions is advised if there is no "base" or catalyst rock available as would be the case in a new start up reactor. The base rock will get a "worm hole" or sawed appearance as if the surface of the lump of metal or rock had been first sawed a few millimeters deep with a band saw. This is a good sign and the "rock" will often be white from excess sodium and this is an expected condition also.

When the gradual reaction and removal rates increase as described above have been done and the base rock reaches 4,000 pounds, then the very tight restrictions (done to the gram) on the control of the rock added is less needed. What has to be determined is how much rock can be reacted and still have the reaction not go over the top of the open topped vessel. The preferred method is increase the base rock gradually, realizing that the actual proper reaction will be in the 12.6758% window, and a residual weight can be calculated for the proper addition for the next reaction.

Any new amount may be added to the base to establish a new base number but the resulting ratio and molar calculation of water and NaOH may yield a reaction that may not stay in the vessel. So raising the total base gradually from reaction to reaction is empirical and based on how high the reaction mixture expands during the reaction and still stays in the vessel. Totals that allow for a growth of the reaction to within one foot of the top of the vessel at maximum reaction is desired. Any more risks over flow and loss of the reaction and damage to the vessel.

The next parts of the process are equally critical. The loading of the chemical and the new rock for the next reaction. Loading the chemical over the top of the vessel will cause what we call an inverted reaction and can and often does fail. Thus, loading the NaOH from the bottom is critical to our method. Using the last of the water to purge the process and loading lines also forces the heavier NaOH into the center of the catalyst rock base and the reaction starts in the middle of the vessel and rolls figure eight outward.

The reaction will be very violent for the first four hours with rolling and boiling and production of "very wet" steam that is hydrogen rich. The last eight hours the dome of the reaction will subside and the material may cover with a dark shell or have a floating material that is mostly silicon metal fines that we call lily pads.

If the reaction is not blended with other material and water before these lily pads and of the cover material becomes very dry, the removal of the finished product is very difficult. We use previously produced material to unstop the valves and to circulate the material in a cooling process before we off load the material for blending with water or other lower than 1.25 material. We circulate the mixtures bottom to top over the sides of the vessel and add water and take specific gravity readings until we are at 1.35-1.38 specific gravity at the current temperature. That varies with the seasons but in the summer that is about 135 degrees F. We circulate the mixture to around 90 degrees F. and the off load it into the primary blending tank.

The blending tanks allow light to pass into them readily since exposure to light and or sunlight is part of the final process for a stable material. When the product is not exposed to light the product stays a blue color and often continues to react, sometimes expanding and damaging the tank.

From the primary blend tank the material is circulated and blended with water for a minimum of two hours and then allowed to settle for two days. We then move all the material into the secondary tank less 800 gallons that we retain for off loading assistance and stabilizing of the next reaction.

In tanks two and three we circulate the materials from subsequent reactions and allow the material to gradually change color to a light amber. This is a product of settling out of silicon fines from the process but is also a product of exposure to the sun.

Final water is added and circulated extensively to make the material exactly 1.25 gravity.

The Chemical Composition of the Silicon Solution

The formula of the silicon solution appears to be as follows:

$$Na=O=[Si+O+H]_6+H_2O$$

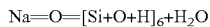

This formula suggests a large degree of potential at the double bonded oxygen. It seems likely that thiophene, formulin, and several other chemicals and compounds may have a strong tendency to attach to the strong double oxygen bond. Numerous new structures may be created in this manner. These materials may have plastic like properties but would be non-petroleum based. These materials may exhibit extremely high strength to weight ratios and be biodegradable.

Production of Silicon Foam

The silicon solutions of the present invention can be heated to produce a silicon foam. We have found that heating the solutions to about 500° F. creates a very white foam. The resultant foam material is stable and has properties that make it ideal for many fire resistant and insulation applications.

The foam exhibits high strength to weight ratio and fire proofing properties that makes it ideal for use in food galleys on commercial aircraft. The foam also exhibits excellent insulation properties at both extreme high and low temperatures that make it ideal for applications such as in process plants where the pipes transfer very hot and very cold effluents. The foam can also be used for steel insulation on high rise buildings. The foam can also be used as an insulation, fire proofing, and sound proofing all-in-one material. This will offer a huge reduction in construction and energy costs as well as greatly increase the amount of floor space available through space savings of using one material to do the job of three materials. Other applications include fire proof and fire resistant materials such as the following: doors, walls for high rise constructions, home construction materials, packaging materials, pads for carpets, mattresses, and motor homes.

Production of Silicon Glass

The silicon foam can be further heated to produce a silicon glass. We have found that heating the foam to its melting point of about 1065° C. creates a silicon glass. Upon cooling, the glass forms into an amorphous state but with addition of select ions it will crystallize into an octahedral quartz-like material that has gemstone qualities. The silicon glass is very stable and does not hydrolyze like common sodium silicate "water glass". The resultant glass has unique properties that make it ideal for uses in laser gems and encapsulation of nuclear and hazardous biological wastes. The glass also exhibits a high strength to weight ratio that makes it ideal for high strength glass applications. Other applications include the following: fine glass fiber non-flammable insulation material, fiber optics with unique optical properties, and cut and colored glass.

One special type of glass can be made by performing the above process using a starting material of very low iron content. The resultant solution formed by the above process is what we call "high purity." The addition of metalized ions to the solution before it is heated to a foam and then a glass, causes color changes similar to that of common glass but unique. In most glass, copper for example makes a blue-green color. In our high purity glass, copper makes a reddish purple color. The addition of gold makes a bright pink color. Gold makes no known color in common glass.

We have performed extensive tests with the high purity material and cerium oxide. Through these tests, we have formed beautiful green stones. We had the stones tested by a gemologist in a light refractory machine. The stone was very bright and lustrous, the machine said it should be a dark opal or about "4" on the scale of 1 to 10 with a diamond being a 10. The stones also exhibited a hardness of 8.5. The stones were easily cut and polished to high luster and was much less dense compared to heavier zirconium stones.

Properties of the Silicon Solutions

The silicon solutions of the present invention are stable, aqueous high ratio $SiO_2:Na_2O$ solutions that effect separation of many organic contaminates from most surfaces. Since the ratio is high (3.4-3.8: 1), very little emulsification takes place. Most "cleaning" is due to a separation of grease and grime from its attached surface.

We believe the excellent cleaning ability of the silicates is due to their ability to pass their negative charge to all entities they contact. Since like negative charges repel one another, the contamination will be repelled from whatever surface it is attached.

The presence of the silicates will also aid in the prevention of the contaminate from re-depositing on a surface. This is an advantage over common sodium metasilicates which tend to emulsify rather than separate and have minimal re-deposition prevention properties.

Applications of Silicon Solutions

Cleaning

The liquid material is ready for use when the manufacturing is complete. For most uses, simply dilute the aqueous silicon solution with water and use.

The liquid solution in ready-to-use form has a high pH yet does not have the typical harmful effects or risks associated with higher pH cleaning compounds. The aqueous solutions of silicon in accordance with the present invention are very safe, non-volatile, and easy to handle. Moreover, the solutions of the instant invention separate petroleum compounds from parts being cleaned to a recoverable and reusable product, essentially restoring its value as "waste oil". Further, the solutions of the instant invention have a far longer life cycle due to totally separating and isolating waste products from not only the parts being cleaned but also itself, enabling continued usage. Because of this separating and isolating, the solutions of the present invention have no negative environmental impact, and no waste-water/effluent issues. Additionally, most known cleaning solutions near the end of their life cycle clean only marginally, leaving unacceptable dirty parts. The solutions of the present invention do not experience this performance drop-off.

Cleaning method using solutions in accordance with the instant invention include, but are not limited to the following: cleaning aromatic sludge tanks (specifically benzene, but also applicable to toluene, xylene, and other type tanks), pits (oil and sludge) and other waste clean up including barges, railcars, rig wash, slop oil recovery including coal slurry pond clean up, gun barrel separator clean up, pipeline cleaning ("Pig" operations) including pipeline "Sock type" filter cleaners, pipeline right of way clean up, site, pad, and staging area clean up and remediation, parts washing, computer circuit board washing, steam cleaning, soil washing, carpet cleaning, carpet cleaning and flea treatment, upholstery cleaning, and cleaning concrete. Typically, for cleaning and washing applications the stable, aqueous silicon solution of the present invention should be diluted with water to provide a cleaning solution that is 1-2% Si solution.

The solutions of the instant invention can by used in accordance with known methods of washing and cleaning. For example, highly aromatic solvents often are absorbed into the matrix of carbon steel tanks. A tank containing such a solvent can be emptied and repeatedly washed with soap and common detergents and then allowed to air dry for weeks or even months. The so called clean tank is still a danger for possible explosions and many have been killed in such accidents. Take the tank and heat it with the lid on with a torch and it will explode as soon as the torch cuts into the tank. Wash the tank with the silicon material of the instant invention and all the solvent will be removed and the risk of explosion is gone.

The solutions of the instant invention will clean surfaces that have been contaminated with hydrocarbons. For example, metal parts used in conjunction with oil drilling and pumping are often coated with oil as they are being used. Such parts can be rinsed or washed with the solutions of the instant invention which will remove the oil contamination. These parts may also be submerged in solutions of the instant invention to achieve a similar effect. Moreover, the solution will separate the hydrocarbon from the parts which can then be recovered restoring its value as waste oil.

The solutions of the instant invention are also useful in methods of cleaning metal surfaces. Simply use the solution as you would any other soap or detergent for superior cleaning results. For example, fast food restaurants use grease in the production or cooking of many of their products. The solutions of the instant invention can be used to clean any of the metal surfaces that get coated or contaminate with this grease. The solutions of the instant invention offer a superior alternative to the cleaning products that are currently available as they are more effective and economical.

Generally, any product or method that is currently using a water soluble base to do a job can likely do the same job cheaper and without the adverse environmental impact using the solutions of the instant invention.

For example, sodium hydroxide is currently used by airlines to treat their process water at airports because the water is highly acidic and cannot be put into common sewers. Sodium hydroxide is costly and dangerous to use handle and store. A solution in accordance with the instant invention is much less dangerous to handle and use, is significantly cheaper and is equally effective in such treatment methods.

Energy companies have the same problem caused by the acid they use to clean their primary burners at lignite coal plants. They use sodium hydroxide in their treatment methods. A solution in accordance with the instant invention is much less dangerous to handle and use, is significantly cheaper and is equally effective in such treatment methods document after the trip.

Oil Recovery

Another embodiment of the present invention is for improved methods of oil recovery. The solutions of the present invention can be substituted for water in the process of water flooding oil reserves. The solutions should generally be between about 0.5% and about 5% aqueous stable silicon solutions made by the process of the present invention. The unique properties of the silicon solutions cause a greater amount of oil to be dislodged by the solutions compared to water. In this manner, the percentage of oil that can be recovered from known oil wells is greatly increased.

EXAMPLE

Tests were performed to determine the oil recovery potential of the silicon solutions of the present invention. The tests were carried out in a flotation cell in a process modeled after actual water flooding used for bitumen recovery from the Athabaska tar sands. The tests were carried out in a 1-liter Denver flotation cell. 300 g of Aurora transition oil sand ore* was dispersed with 950 ml of 1.5% aqueous silicon solution at 50° C. under agitation of 1500 rpm. After slurry was conditioned for 5 minutes, the aeration was started. The bitumen froth was then collected for 15 minutes. The collected sample was then assayed. For the purpose of comparison, the same procedure was taken for a flotation using de-ionized (DI) water and tap water. Table I shows the results of the test.

TABLE I

| Tests | Recovery | Grade | Bitumen/Solid |
|---|---|---|---|
| 1.5% Silicon solution | 78 | 21 | 2.1 |
| DI water | 92 | 8 | 0.5 |
| Tap water | 93 | 6.6 | 0.6 |

*Grade of Aurora transition oil sand ore is 9.2%.

The results clearly show that the ratio of bitumen to solid was between three to four times higher with the silicon solution of the present invention compared to water. Accordingly, the use of the silicon solutions causes improved separation between the bitumen and tar sands. Thus, the quality of the bitumen recovered from the tar sands is much higher than that recovered by traditional water flooding.

Further Developments

We are in the process of several developments based on the silicon solutions that may become the subject matter of future related patent applications, these developments include the following:

1. Development of Gemstone Technology

We have made, cut, and polished very attractive stones from heating the silicon solution. However, larger and more powerful furnaces are needed to further develop this work. Most of the "stones" we are interested in are in the melting range of around 1300+° C. We estimate that temperatures as high as 1500° C. will be needed to produce emeralds. We are especially interested in using beryl and beryllium because aluminum beryllosilicate ($A_{12}[Be_3Si_6O_{18}]$) is the chemical structure for the primary structure in emeralds, and beryl and certain forms of beryllium are very useful in suppressing the movements of neutrons and as such are integral within the nuclear energy business. Beryllium based shields are used as "deflectors" when neutron bombardment would be detrimental or even dangerous. This may be particularly useful in space based weaponry.

Similarly, beryllium is one third the weight of aluminum and has enormous strength to weight ratios. Beryl, which is somewhat common, might also be converted to beryllium by a high temperature reduction mechanism. This would provide a readily available form of beryllium that is as rare as arsenic, in nature. We also contemplate making a beryllium and silicon coating by electrodeposition that might eliminate corrosion. We have strong reason to believe that we can reduce the beryl crystals and make beryllium and during that process there would be a "solution" phase that if we could stabilize it in that "state" we could use the silicon material as a carrier and make electrodepositions.

We have made stable hexagonal crystals of the silicon material. We have made various other types of "gem" stones. We introduced sub-bituminous coal into the matrix at 1200° C., and produced a green "gem" stone that was very much like an emerald except it had no beryl (or in fact just the aluminum in beryl, in it.

2. Encapsulation of Nuclear Waste

Encapsulation of low level nuclear waste is an important problem. Low level nuclear waste is routinely encapsulated in a product developed by Dow Chemical called BORO-SILICATE. It is a boron and glass mixture and they melt it and pour over containers full of low level nuclear wastes. The original test for qualifying for the government's Savannah River Project contract was to take a specimen of cerium oxide and encapsulate it in a vitreous glass material and then subject it to the 30 day ionized water test. The original test was to allow only 3 parts per billion.

We passed this original test while Dow's BORO-SILICATE failed. We believe that we extracted all the outer ring oxygen electrons off the cerium oxide and made either a stable water-insoluble material of unknown nature or reduced the oxygen completely, and the result was pure cerium metal, which is also insoluble in water. This same encapsulation ability could be used for biological and other very serious hazards that now have very poor remediation methods.

3. Electrodeposition of Silicon

This could revolutionize the computer chip business and the photo-voltaic cell business. Very long lasting lightweight batteries could also be made this way. We have not only made depositions of silicon using highly pure silicon solutions of the present invention on small scale but also have made depositions of non-amorphous carbon or diamond. We have also electroplated cobalt, gold, zinc/silicon, and many other materials to form ultra thin-film depositions.

4. Development of a New and Previously Unknown Form of Energy

We believe that we have found an unlimited, non-radioactive power to end all energy worries forever. We have observed the results of what we call "plasma energy". We are developing ways to harness it.

With unlimited power we could use electrolysis and extract hydrogen from the sea and then reform any hydrocarbons we might need. Hydrogen fueled cars with no emissions except water vapor could be easily developed with an unlimited source of hydrogen. Heated and cooled houses with no emissions and at almost no or very low costs would also be possible. The sea also has all the rare earth and other precious metals we would ever need. Mining for minerals would become obsolete. We would get them all from the sea. As a bi-product of our electrolysis we would extract all of them. The offshore electrolysis plants would have as the bi-product of the hydrogen development and metals extraction, an almost unlimited supply of oxygen. This could lead to the end of the Greenhouse Effect.

5. Means and Methods for Extraction, Collection, Refinement and Development of Orbitally Realigned Mono-Atomic Elements Often Called ORMEs This material which is in its "very green" development stage suggests all manner of things across science, religion, philosophy and things esoteric. It is associated with recovery of less than 150 micron size gold and the associated "slime" material which we have found to have unique properties. These materials are believed to hold the very essence of life powers including curative as well as other paranormal potentials. Things like ultra-conductivity, levitation, energy amelioration are all believed attainable.

While the invention has been described with reference to certain exemplary embodiments thereof, those skilled in the art may make various modifications to the described embodiments of the invention without departing from the scope of the invention. The terms and descriptions used herein are set forth by way of illustration only and are not meant as limitations. In particular, although the present invention has been described by way of examples, a variety of compositions and methods would practice the inventive concepts described herein. Although the invention has been described and disclosed in various terms and certain embodiments, the scope of the invention is not intended to be, nor should it be deemed to be, limited thereby and such other modifications or embodiments as may be suggested by the teachings herein are particularly reserved, especially as they fall within the breadth and scope of the claims here appended. Those skilled in the art will recognize that these and other variations are possible within the scope of the invention as defined in the following claims and their equivalents.

What is claimed is:

1. A method of recovering oil from an oil bearing material comprising:
   providing a vessel having cone shaped bottom and containing a predetermined amount of silicon rock, wherein the silicon rock comprises at least 99 molar percent silicon and 0.393 molar percent iron;
   introducing a predetermined quantity of water into the vessel in such a manner as to provide contact with the rock;
   adding a predetermined amount of NaOH solution to the rock and water through the bottom of the vessel, thereby forming a reaction mixture;
   allowing the reaction to run for 10-14 hours to thereby form a reacted solution;
   offloading the reacted solution to a settling tank;
   allowing the reacted solution to settle for 2-4 days to thereby form a settled reacted solution;
   moving the settled reacted solution to a second settling tank for 10 days;
   moving the settled reacted solution to a bulk storage tank;
   exposing the settled reacted solution to ultraviolet radiation to form an aqueous silicon solution;
   diluting the aqueous silicon solution with water to form a diluted aqueous silicon solution; and
   flooding an oil bearing material with the diluted aqueous silicon solution to recover oil from the oil bearing material.

2. The method of claim 1, wherein the diluted aqueous solution is 0.5-5% by volume the aqueous silicon solution.

3. The method of claim 1, wherein the predetermined quantity of water and predetermined amount of NaOH are calculated based on a molar ratio of NaOH to silicon to water of between 1:5.75:9 and 1:7.75:12.

4. The method of claim 2, wherein the diluted aqueous solution is 1.5% by volume the aqueous silicon solution.

5. A method of separating oil from a surface of a material, the method comprising:
   providing a vessel having a cone shaped bottom;
   providing a starting amount of silicon rock, wherein the silicon rock comprises at least 99 molar percent silicon and 0.393 molar percent iron;
   providing a predetermined amount of water into the vessel such that the water comes into contact with the silicon rock;
   providing a predetermined amount of NaOH to the rock and water through the bottom of the vessel, thereby forming a reaction mixture;
   allowing the reaction to run for 10-14 hours to thereby form a reacted solution;
   offloading the reacted solution out of the vessel;
   exposing the reacted solution to ultraviolet radiation to form an aqueous silicon solution;
   diluting the aqueous silicon solution with water to form a diluted aqueous silicon solution; and
   providing the diluted aqueous silicon solution to the surface of the material to separate the oil from the surface,
   wherein the predetermined amount of water and NaOH are calculated based the starting amount of silicon in the silicon rock such that the molar ratio of the NaOH to silicon to water is between 1:5.75:9 and 1:7.75:12.

6. The method of claim 5, wherein the diluted aqueous solution is 0.5-5% by volume the aqueous silicon solution.

7. The method of claim 6, wherein the diluted aqueous solution is 1.5% by volume the aqueous silicon solution.

* * * * *